(12) United States Patent
Sprague

(10) Patent No.: US 8,708,221 B1
(45) Date of Patent: Apr. 29, 2014

(54) PACKAGING INFORMATION DISTRIBUTION AND TRACKING SYSTEM AND METHOD

(75) Inventor: Jason J. Sprague, Novi, MI (US)

(73) Assignee: Plastipak Packaging, Inc., Plymouth, MI (US)

( * ) Notice: Subject to any disclaimer, the term of this patent is extended or adjusted under 35 U.S.C. 154(b) by 114 days.

(21) Appl. No.: 12/879,670

(22) Filed: Sep. 10, 2010

Related U.S. Application Data

(60) Provisional application No. 61/328,886, filed on Apr. 28, 2010.

(51) Int. Cl.
*G06F 17/00* (2006.01)

(52) U.S. Cl.
USPC .......................................... 235/375; 235/487

(58) Field of Classification Search
USPC ................ 235/375, 487, 462.46, 472.01, 381
See application file for complete search history.

(56) References Cited

U.S. PATENT DOCUMENTS

| | | | |
|---|---|---|---|
| 7,156,311 B2 | 1/2007 | Attia et al. | |
| 7,184,972 B2 | 2/2007 | Flaherty | |
| 7,287,696 B2 | 10/2007 | Attia et al. | |
| 7,309,015 B2 | 12/2007 | Frantz et al. | |
| 7,387,250 B2 | 6/2008 | Muni | |
| 7,693,744 B2 | 4/2010 | Forbes | |
| 7,770,752 B2 * | 8/2010 | Gruskin et al. | 220/771 |
| 2004/0081729 A1 * | 4/2004 | Garwood | 426/235 |
| 2005/0218126 A1 * | 10/2005 | Leyvraz | 219/121.69 |
| 2006/0045390 A1 * | 3/2006 | Sill et al. | 383/6 |
| 2007/0119955 A1 * | 5/2007 | Barenburg et al. | 235/494 |
| 2007/0126578 A1 * | 6/2007 | Broussard | 340/572.1 |
| 2008/0270233 A1 | 10/2008 | Yip et al. | |
| 2009/0173779 A1 * | 7/2009 | Szesko et al. | 235/375 |
| 2009/0276081 A1 * | 11/2009 | Pandit et al. | 700/214 |
| 2010/0257819 A1 * | 10/2010 | Schach | 53/411 |

OTHER PUBLICATIONS

Hirako Kato; Keng T. Tan; "Pervasive 2D Barcodes for Camera Phone Applications"; Pervasive Computing, Oct.-Dec. 2007, pp. 76-85, Published by IEEE Computer Society.

* cited by examiner

*Primary Examiner* — Edwyn Labaze
(74) *Attorney, Agent, or Firm* — Dykema Gossett PLLC

(57) ABSTRACT

A system and method for distributing and tracking product information to users, such as consumers, is described. In an embodiment, a plurality of articles intended for distribution are provided. The articles are labeled to include a digitally readable code that is controllably variable with respect to each individual article. The labeled articles are arranged for distribution and are then distributed. A user can capture (e.g., photograph or scan) the digitally readable code using a portable electronic device. The captured digitally readable code may, among other things, provide various product information that can, if desired, be viewed on the electronic device.

20 Claims, 4 Drawing Sheets

PACKAGING INFORMATION DISTRIBUTION AND TRACKING SYSTEM AND METHOD

CROSS-REFERENCE TO RELATED APPLICATION

This application claims the benefit of U.S. Provisional Application No. 61/328,886, filed Apr. 28, 2010, which is hereby incorporated by reference as though fully set forth herein.

TECHNICAL FIELD

This invention relates to a processes, systems and methods for distributing and/or tracking packaging related information, including information associated with digitally printed container packaging.

BACKGROUND

Barcodes have been used for many years to identify products and pricing. In more recent times, enhanced barcodes, including matrix codes or two-dimensional barcodes, have been developed and employed. Moreover, mobile devices with optical machine-readable or scanning capabilities are becoming increasingly common. A user with a mobile device—such as a phone with a camera and/or scanning feature—can now photograph or scan an image of a barcode. The captured or scanned image of a barcode may, in turn, automatically launch an associated browser to a programmed uniform resource locator (URL), such as an "address" of a web page on the World Wide Web.

SUMMARY

A system and method for distributing and tracking product information to users, including consumers, is disclosed. In an embodiment of the disclosed system a plurality of articles intended for distribution are provided. The articles are labeled to include a digitally readable code that is controllably variable with respect to each individual article. The labeled articles are arranged for distribution and are subsequently distributed. A user can capture (e.g., photograph or scan) the digitally readable code using a portable electronic device. In embodiments, the captured digitally readable code may, among other things, provide various product information that can be viewed on the electronic device.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention.

Figure 1:
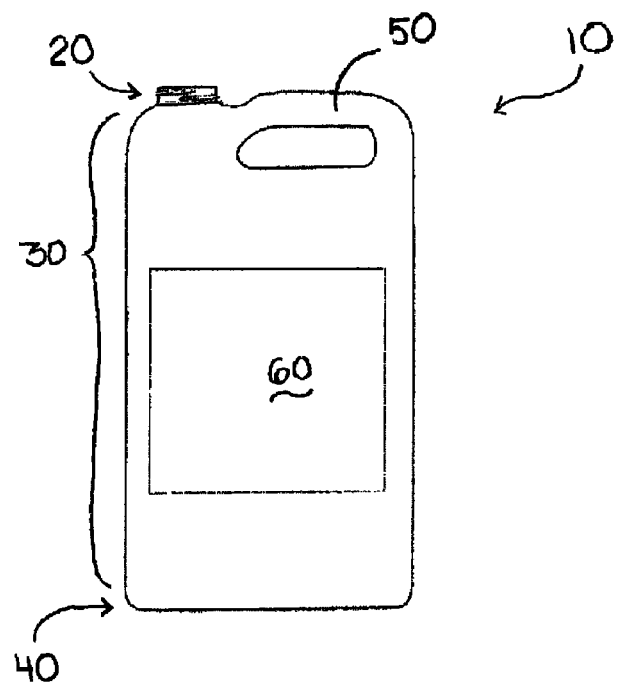
FIG. 1 generally illustrates an article of the type that may be used in connection with an embodiment of the disclosure.

FIG. 1 generally illustrates a plastic container 10 provided in accordance with an embodiment of the disclosure. The plastic container 10 may include a neck portion 20, a body portion 30, and a base portion 40. The plastic container 10 may optionally include a handle portion 50, which may be a pass-through, pinch-grip, or separately attached handle. In other embodiments, the container may be comprised of glass, ceramic, or metals.

With embodiments, the plastic container 10 may also include a label panel area 60, which may receive a label. Such a label may be comprised of paper, plastic, polymer blends, or a combination of such, and may be applied using adhesive, heat treatment, or various other known processing techniques for label application. Additionally or alternatively, a label may be provided in the form of a digitally printed label in which ink is applied directly to the surface of the container, as opposed to a separately-applied pre-printed label or substrate. By way of example and without limitation, digital printing processes such as those disclosed in connection with U.S. patent application Ser. Nos. 11/219,411 (filed Sep. 2, 2005), 11/562,655 (filed Nov. 22, 2006), 11/716,447 (filed May 9, 2007), 12/490,564 (filed Jun. 24, 2009), and 12/581,952 (filed Oct. 20, 2009) may be employed.

The plastic container 10 may be a molded plastic container that can, for example, be obtained from injection molding, injection stretch blow molding, extrusion blow molding, and/or compression molding. Plastic container 10 may be comprised of plastic in either a monolayer or multilayer configuration. In a monolayer configuration, plastic container 10 may be comprised of one of the following polymers: polyethylene (PE), polyethylene terephthalate (PET), high-density polyethylene (HDPE), polypropylene (PP), and other known polymers known in the container art. In a multilayer configuration, plastic container 10 may include two or more layers of polymers that are provided over all or portions of the container.

In embodiments, the plastic container 10 may be cylindrical or non-round. A non-round embodiment of a plastic container 10 may, for example, include at least two sides of non-constant radius. If desired, each side may include a label panel area 60, which may include a label.

One or more labels—which can be provided in a variety of configurations and forms—may be provided on or to the label panel area 60 to convey information. It is noted that one or more labels may instead, or in addition, be provided to areas other than the label panel areas. Such information may, among other things, include various information associated with the container or associated product. The information may include, without limitation, product name, description, manufacturer, brand owner, brand name, nutritional information, product code, barcode, product uses, patent markings, contact information, etc.

Figure 2:
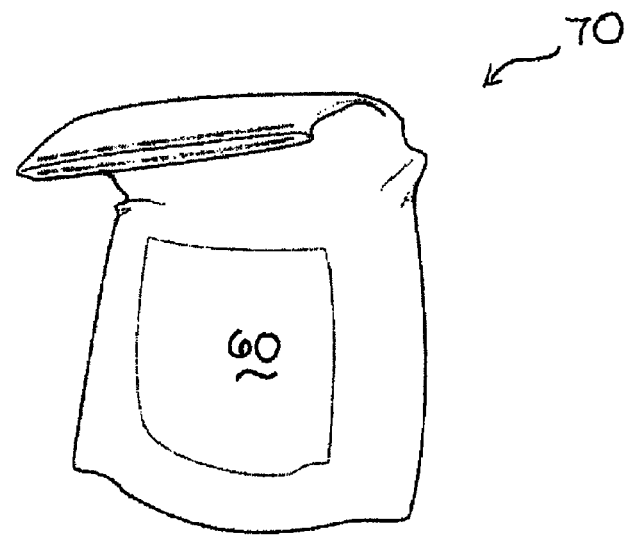
FIG. 2 generally illustrates another type of article that may be used in connection with an embodiment of the disclosure.

FIG. 2 generally illustrates a package 70 provided in accordance with another embodiment of the disclosure. In the illustrated embodiment, the package 70 includes flexible portions, and may also include at least one label panel area 60. When it is intended that a digitally printed label is to be applied to one or more label panel areas, the label panel areas may comprise a material that is suitable to receive digitally printed ink.

Figure 3A:
FIG. 3a generally illustrates an example of a one-dimensional barcode that may be used in connection with an embodiment of the disclosure.

FIG. 3a generally illustrates an example of a one-dimensional barcode 80 that may be provided in connection with an embodiment of the present disclosure. Also known as a "linear barcode," a one-dimensional barcode may, as generally shown, comprise a plurality of parallel lines. Such lines represent information or data that may be read digitally based upon line width, spacing, and frequency/number. With embodiments, one or more such one-dimensional barcodes may be digitally printed on a package, such as a plastic container (e.g., FIG. 1) or package (e.g., FIG. 2).

Figure 3B:
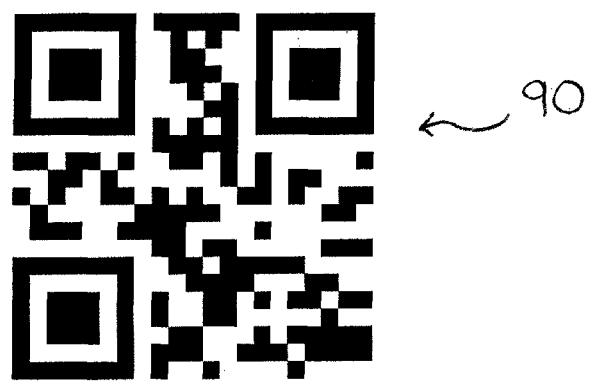
FIG. 3b generally illustrates an example of a two-dimensional barcode that may be used in connection with an embodiment of the disclosure.

FIG. 3b generally illustrates an example of a matrix code or two-dimensional (2D) barcode 90 that may be used in connection with an embodiment of the disclosure. Examples of two-dimensional barcodes include, without limitation, "Quick Response" (QR) code, VSCode, and Data Matrix code. The 2D barcodes may store information, and can effectively serve as portable databases that permit users to access the associated information anytime and anywhere, regardless of connectivity. The 2D barcode may include all types of data including, for example, symbols, binary data, control codes, and multimedia data. Further, such 2D codes may employ various enhancement and/or masking techniques known in the industry. It is additionally noted that the 2D codes may be provided in other forms. For instance, the 2D code may take the form of a circular 2D-barcode tag or "ringcode." With embodiments, one or more such two-dimensional barcodes may be digitally printed on a package, such as a plastic container (e.g., FIG. 1) or package (e.g., FIG. 2).

By employing digital printing capabilities with the associated packaging, each and every container/package may be separately and uniquely labeled, and may be labeled "on-the-fly," without necessitating a physical labeling change-over. That is, whereas prior printing and labeling techniques commonly provide successive containers with pre-printed identical or substantially identical codes or labeling, embodiments of the instant disclosure that employ digitally-printed barcodes (or similar identifiers) may provide a unique code or image (associated with unique package-related information) in connection with each and every container vis-à-vis the digital print programming.

Figure 4:
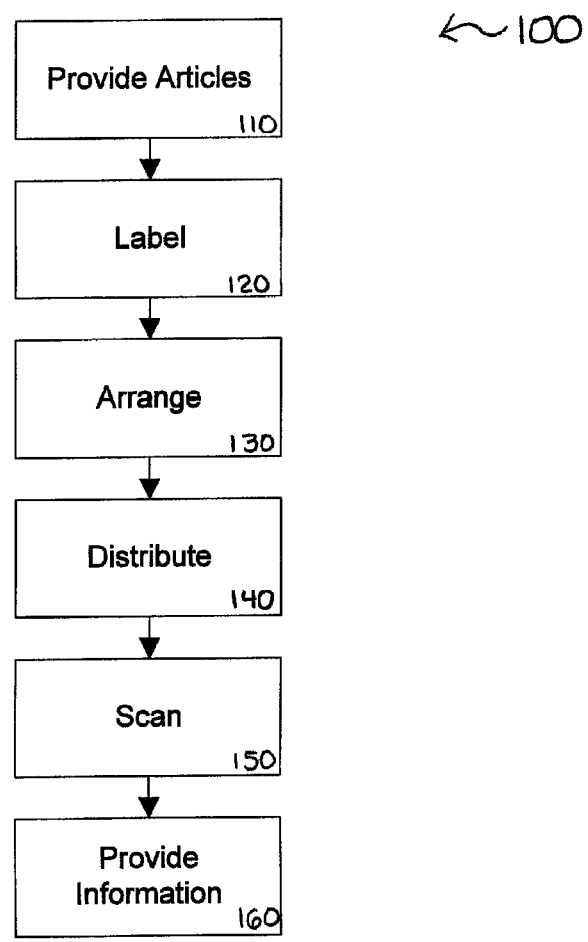
FIG. 4 generally illustrates a flowchart of processes or stages that may be associated with a system in accordance with an embodiment of the disclosure.

FIG. 4 generally illustrates a flowchart 100 of processes or stages that may be associated with a system in accordance with an embodiment of the disclosure. The stages may comprise multiple steps. First, in step 110, a plurality of articles intended for commercial distribution are provided. Such articles may, for example, comprise plastic containers, flexible packages, or other forms of packaging that may or may not already contain products.

In step 120, articles are labeled. The labeling process may involve digitally printing one or more barcodes on one or more articles. Such labeling may comprise directly printing a barcode on the surface of the article, or the initial printing of a substrate followed by the digital printing of a barcode on the substrate. The inks employed for such digital printing may comprise inks that are known for digital printing on containers or packages, including inks that are curable by ultraviolet light.

Further, the labeling associated with step 120 may include the digital printing of a digitally readable code, such as a one-dimensional barcode or a two-dimensional barcode. The application of such code may be controllably varied or modified article-to-article. That is, articles to be labeled in sequence may be labeled with different digitally printed codes. For example, if ten consecutive articles are presented for labeling, each of the ten articles may be labeled individually with a different barcode having unique information. Because the barcodes are digitally printed, the barcodes may be pre-programmed or programmed in real time. Further, each code may have an embedded digital code that is readable by an appropriate electronic device, such as a personal data assistant (PDA), a cellular telephone (or "cell phone"), or other mobile devices.

At step 130, which is designated in shorthand as "Arrange," the labeled articles are arranged or prepared for distribution. This may involve, inter alia, arranging, palletizing, bundling, or otherwise grouping the articles. Such actions may be based on a pre-determined sorting method, such as grouping all articles that have a same or similar code, or all articles that are intended to be delivered to the same final destination.

Distribution step 140 may generally comprise distributing the articles by various means, such as truck, train, airplane, and other means. Such distribution may involve transporting the articles to destinations from which they will be sold, or where they may be further processed or brought to a different location for sale.

Scanning step 150 may be conducted at a subsequent location, such as where the articles are to be sold. Such a location might include a retail sales location, such as a store or supermarket, but may also be a wholesale or warehouse location. In an embodiment, a user (e.g., consumer) may use a portable electronic device (such as a mobile phone) to take a picture or scan a digitally-printed, digitally-readable barcode provided on an article. Depending on the controllably varied embedded code, which may be provided by the manufacturer, such digital capture (via a suitable device and application) may be used to provide various information. It is noted that for embodiments, various forms of convenience-oriented applications aimed at mobile phone users, such as mobile tagging, may be utilized.

At step 160, a user may be provided with additional information. The information may, for instance, be related to the product in the scanned container or package. For instance, if desired, the information that is presented may also relate to other products that may be owned or marketed by a related company, for instance, as a potential marketing or co-branding initiative. In embodiments, a customizable code may be used to provide a hyperlink that can provide additional information, such as coupons, product uses, co-branding activities, events, etc. Further, the information that is provided may be tailored by region, type of store, or various other established criteria.

In embodiments, the scanned article may be digitally labeled with a code having an embedded hyperlink. Such a hyperlink may be accessed via the World Wide Web or the Internet on a compatible mobile device. In embodiments, a user with a portable electronic device (e.g., a camera phone equipped with a reader application may scan a barcode with a QR Code that will cause the phone's browser to launch and redirect to a programmed URL). Moreover, such a hyperlink can be individually tailored to each article, or by groups of articles. For example, without limitation, all articles going to a single retail outlet or geographic region may include an embedded code that differs from codes placed on articles intended for different retail outlets and/or geographic regions. The information thus contained may be tailored to specific criteria as desired by outlet, region, pricing zone, or various other considerations. Also, if the code includes a hyperlink, the information provided at such hyperlink may be edited even after the code has been applied to the article. This allows great possibilities of product differentiation, especially at late stages, customized information distribution, and market tracking. For further example of an embodiment of the invention, two identical products having different unique barcodes may be for sale in different geographic areas, such as Detroit, Mich. and Dallas, Tex. When the product in Detroit is scanned, it may present the user with unique information tailored specifically to the Detroit market. That is, the information provided to a user in Detroit may be different than the information provided to a user in Dallas, even though the product is the same, due to a difference in the respective unique codes.

Manufacturers and/or consumer product companies may also track information by use of such scanned codes. For example, if the embedded code is a hyperlink, it can count how many "hits" it gets per scanned code, thus being able to identify demographic area demand differences. The associated company may employ various architectures that help in tracking the activities of a user while interacting with the accessed content.

Further, for some embodiments, a unique code on each article (e.g., a 2-D barcode) may link to a specific website that may be configured to authenticate the article (such as part of an anti-counterfeiting measure). For example, each article may have its own ID number as part of the provided URL. When a user scans the barcode, the URL may open to show that individual article's information. The information may, for instance, comprise product name, manufacturing place/date, etc. Also, it is possible, if desired, to report all of the other times the article was scanned. For example, "This package was scanned_times." It could also optionally give an "opinion" as to authenticity. It is further possible to show the date, time, and place of the past scans, as this information would be obtainable by IP address (i.e. "Apr. 26, 2010, 16:25 GMT, New York, N.Y.").

Figure 5A:
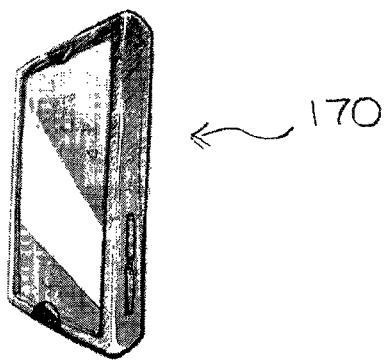
FIGS. 5a through 5c generally illustrate an example of a portable electronic device in several contexts according to embodiments of the disclosure.
Figure 5B:
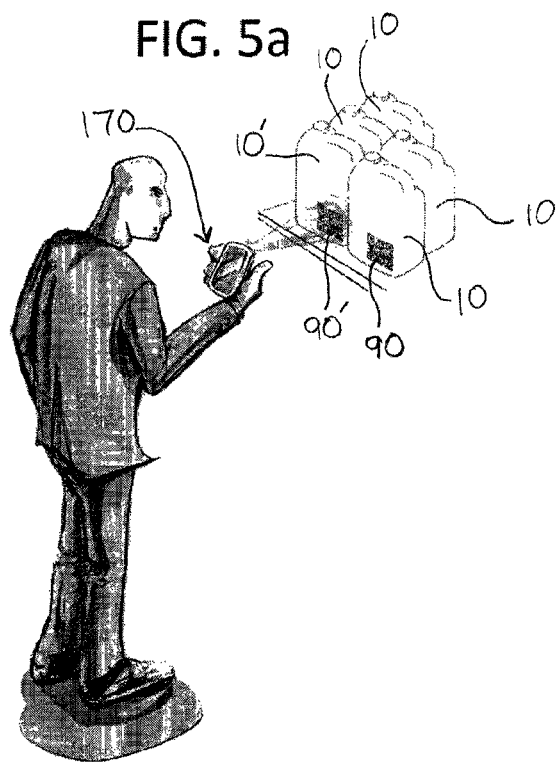
Figure 5C:
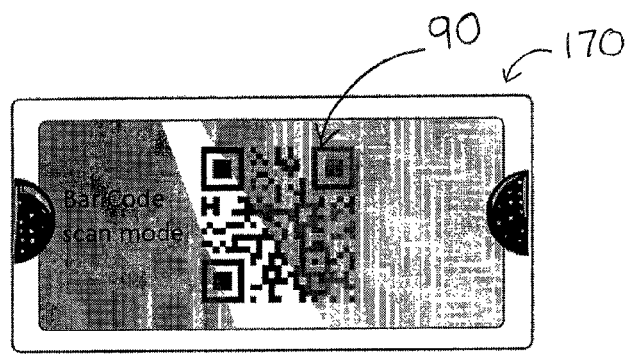

FIG. 5a generally illustrates a portable electronic device 170 that may be used in connection with an embodiment of the disclosed invention. Such electronic device 170 may comprise a personal data assistant (PDA), a cellular telephone (or "cell phone"), or other mobile device. FIG. 5b generally depicts a user using an electronic device 170 to photograph or scan a barcode 90' provided on a specific container 10'. FIG. 5c shows a screen capture of the barcode 90' on the electronic device 170.

Although numerous embodiments of this invention have been described above with a certain degree of particularity, those skilled in the art could make numerous alterations to the disclosed embodiments without departing from the spirit or scope of this invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method for distributing and tracking information associated with containers or packages, the method comprising:
    providing a plurality of plastic containers for distribution;
    labeling the plastic containers, the labeling including digitally printing a digitally-readable code directly on a curved outer surface of independent plastic containers, wherein the digitally-readable code is controllably variable on a container-by-container basis to provide unique container-specific information in connection with the plastic container to which it is applied;
    distributing the plastic containers; and,
    capturing the digitally-readable code on a portable electronic device,
    wherein the digitally-readable code of at least one of the plastic containers includes a hyperlink that corresponds to a website that contains marketing and/or co-branding information, and the marketing and/or co-branding information associated with a first container corresponds to a first geographic region and the marketing and/or co-branding information associated with a second container corresponds to a second geographic region.

2. The method of claim 1, wherein the plastic containers are cylindrical or nonround.

3. The method of claim 1, wherein the plastic containers have two sides with a non-constant radius.

4. The method of claim 1, wherein the plastic containers include a flexible portion and a label panel area in the flexible portion.

5. The method of claim 1, wherein the plastic containers include a handle.

6. The method of claim 1, wherein the digitally-readable code includes a one-dimensional barcode.

7. The method of claim 1, wherein the digitally-readable code includes a matrix code or two-dimensional barcode.

8. The method of claim 1, wherein the digitally-readable code comprises a circular 2D-barcode tag.

9. The method of claim 1, wherein the digitally-readable code includes a hyperlink.

10. The method of claim 1, wherein the labeling of individual plastic containers is done in real time on a container-by-container basis.

11. The method of claim 1, wherein the digitally-readable code comprises an embedded digital code that is readable by an electronic device.

12. The method of claim 1, including arranging of the plastic containers for distribution.

13. The method of claim 12, wherein the arranging of the plastic containers for distribution includes grouping the plastic containers based on a sorting method that utilizes the digitally-readable code.

14. The method of claim 13, wherein plastic containers are grouped based on destination information associated with the digitally-readable code.

15. The method of claim 1, wherein the capturing of the digitally-readable code on a portable electronic device includes scanning.

16. The method of claim 1, wherein the capturing of the digitally-readable code on a portable electronic device includes taking a picture of the digitally-readable code.

17. The method of claim 1, wherein the marketing and/or co-branding information corresponds to an intended shipping destination of the at least one of the plastic containers.

18. The method of claim 17, wherein the intended shipping destination includes a type of store.

19. The method of claim 1, including tracking information concerning access to the digitally-readable code.

20. The method of claim 1, wherein a unique code is applied to at least one of the plurality of plastic containers, and a website is configured to authenticate at least one plastic container.

* * * * *